(12) United States Patent
Liu et al.

(10) Patent No.: US 11,579,099 B2
(45) Date of Patent: Feb. 14, 2023

(54) X-RAY REFLECTOMETRY APPARATUS AND METHOD THEREOF FOR MEASURING THREE DIMENSIONAL NANOSTRUCTURES ON FLAT SUBSTRATE

(71) Applicant: INDUSTRIAL TECHNOLOGY RESEARCH INSTITUTE, Hsinchu (TW)

(72) Inventors: Chun-Ting Liu, Taichung (TW); Wen-Li Wu, Hsinchu (TW); Bo-Ching He, Hsinchu (TW); Guo-Dung Chen, New Taipei (TW); Sheng-Hsun Wu, Zhubei (TW); Wei-En Fu, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 227 days.

(21) Appl. No.: 17/037,115

(22) Filed: Sep. 29, 2020

(65) Prior Publication Data

US 2021/0109042 A1   Apr. 15, 2021

Related U.S. Application Data

(60) Provisional application No. 62/914,567, filed on Oct. 14, 2019.

(30) Foreign Application Priority Data

Jul. 14, 2020   (TW) ................................ 109123688

(51) Int. Cl.
*G01N 23/20*   (2018.01)
*G01N 23/20008*   (2018.01)
(Continued)

(52) U.S. Cl.
CPC ....... *G01N 23/20* (2013.01); *G01N 23/20008* (2013.01); *G01N 23/223* (2013.01);
(Continued)

(58) Field of Classification Search
None
See application file for complete search history.

(56) References Cited

U.S. PATENT DOCUMENTS 6,771,735 B2 * 8/2004 Janik ..................... G01B 15/02
378/70
6,987,832 B2   1/2006 Koppel et al.
(Continued)

FOREIGN PATENT DOCUMENTS

CN    110036284 A    7/2019
JP    2012013659 A * 1/2012
(Continued)

OTHER PUBLICATIONS

Freychet et al., "Estimation of Line Cross Sections Using Critical-Dimension Grazing-Incidence Small-Angle X-Ray Scattering", Physical Review Applied 12, 044026, 2019, p. 044026-1-044026-8.
(Continued)

*Primary Examiner* — Thomas R Artman
(74) *Attorney, Agent, or Firm* — Birch, Stewart, Kolasch & Birch, LLP

(57) ABSTRACT

This disclosure relates to an apparatus and methods for applying X-ray reflectometry (XRR) in characterizing three dimensional nanostructures supported on a flat substrate with a miniscule sampling area and a thickness in nanometers. In particular, this disclosure is targeted for addressing the difficulties encountered when XRR is applied to samples with intricate nanostructures along all three directions, e.g. arrays of nanostructured poles or shafts. Convergent X-ray with long wavelength, greater than that from a copper anode
(Continued)

of 0.154 nm and less than twice of the characteristic dimensions along the film thickness direction, is preferably used with appropriate collimations on both incident and detection arms to enable the XRR for measurements of samples with limited sample area and scattering volumes.

17 Claims, 6 Drawing Sheets

(51) Int. Cl.
G01N 23/2206 (2018.01)
G01N 23/223 (2006.01)
G01N 23/2273 (2018.01)

(52) U.S. Cl.
CPC ..... *G01N 23/2206* (2013.01); *G01N 23/2273* (2013.01); *G01N 2223/051* (2013.01); *G01N 2223/052* (2013.01); *G01N 2223/071* (2013.01); *G01N 2223/076* (2013.01); *G01N 2223/085* (2013.01); *G01N 2223/1016* (2013.01)

(56) References Cited

U.S. PATENT DOCUMENTS

| | | | | |
|---|---|---|---|---|
| 7,139,365 | B1 * | 11/2006 | Janik | G01N 23/20 378/70 |
| 7,558,371 | B2 | 7/2009 | Park et al. | |
| 8,731,138 | B2 | 5/2014 | Yokhin et al. | |
| 9,588,066 | B2 * | 3/2017 | Pois | G01N 23/207 |
| 9,823,203 | B2 * | 11/2017 | Yun | G01N 23/205 |
| 10,119,925 | B2 | 11/2018 | Pois et al. | |
| 10,151,713 | B2 * | 12/2018 | Wu | G01B 15/08 |
| 11,036,898 | B2 * | 6/2021 | Chouaib | G01R 31/309 |
| 11,333,621 | B2 * | 5/2022 | Wack | G01N 23/20008 |
| 2003/0086533 | A1 * | 5/2003 | Janik | G01B 15/02 378/138 |
| 2015/0204802 | A1 * | 7/2015 | Pois | G01N 23/207 378/86 |
| 2016/0178540 | A1 | 6/2016 | Yun et al. | |
| 2016/0341674 | A1 | 11/2016 | Wu et al. | |
| 2017/0176354 | A1 * | 6/2017 | Pois | G01N 23/201 |
| 2019/0017946 | A1 | 1/2019 | Wack et al. | |
| 2019/0286787 | A1 * | 9/2019 | Chouaib | G01R 31/311 |
| 2021/0109042 | A1 * | 4/2021 | Liu | G01N 23/20 |
| 2022/0120561 | A1 * | 4/2022 | Liu | G01N 23/20 |

FOREIGN PATENT DOCUMENTS

| | | | |
|---|---|---|---|
| JP | 5504502 | B2 * | 5/2014 |
| TW | 201602514 | A | 1/2016 |
| TW | 201917348 | A | 5/2019 |
| TW | I660154 | B | 5/2019 |
| TW | 201946175 | A | 12/2019 |
| WO | WO 2017/203406 | A | 11/2017 |

OTHER PUBLICATIONS

Lee et al., "Nanoimprint pattern transfer quality from specular x-ray reflectivity", Applied Physics Letters 87, 263111, 2005, pp. 263111-1-263111-3.

Lee et al., "X-ray Reflectivity Measurements of Nanoscale Structures: Limits of the Effective Medium Approximation", AIP Conference Proceedings 931, 209, 2007, pp. 209-215.

* cited by examiner

X-RAY REFLECTOMETRY APPARATUS AND METHOD THEREOF FOR MEASURING THREE DIMENSIONAL NANOSTRUCTURES ON FLAT SUBSTRATE This application claims the benefits of U.S. provisional application Ser. No. 62/914,567, filed Oct. 14, 2019 and Taiwan application Serial No. 109123688, filed Jul. 14, 2020, the disclosures of which are incorporated by reference herein in its entirety.

TECHNICAL FIELD

The disclosure relates in general to measuring device, and more particularly to an X-ray reflectometry (XRR) apparatus and a method thereof for measuring three dimensional nanostructures on a flat substrate.

BACKGROUND

XRR is a powerful technique to investigate surfaces and interfaces including their roughness, diffuseness across buried layers and thickness of single layer and multilayer stacks by depth profiling the electron density in the direction normal to the sample surface with a sub-nanometer resolution. It has also been shown that XRR is capable of quantifying the cross section profile of surface patterns, for example, the cross section of line gratings fabricated by nanoimprint as well as the molds used to imprint the patterns. The efficacy and the limit of the application of XRR to nanoscale surface patterns are based on the effective medium approximation (EMA) as illustrated previously. It should be noted that the equivalent concept of EMA has been used in estimating effective refractive index of porous material for ellipsometry or scatterometry. The validity of EMA for nanostructures depends on the coherence length of the incident X-ray; EMA becomes applicable when the coherence length is greater than the lateral characteristic length of the nanostructure along the direction of interest. In such cases, the structure space ratio at any given depth along the surface normal can be deduced from the XRR results. In summary, XRR can be used to measure film thickness as well as the cross sectional shape of arrays of line gratings when the incidence X-ray possesses sufficient effective coherence length along the direction of interest. For this reason the line grating is placed with the line along the incident slit width direction or the x-axis, the x-axis is also the detector slit width direction. The slit opening size is typically smaller than the slit width by a few orders of magnitude. In specular XRR geometry, the effective coherence length along the y-axis can be in micrometers whereas in nanometer along the x-axis. For line gratings there is little, if any, structure variations along the x-axis, the above is not true for 3D nanostructures, i.e. a preferred azimuthal orientation does not exist for 3D nanostructured samples. In addition to the challenge in terms of the lateral coherence length on the XRR measurements of nanostructures on a flat substrate, there is also an issue of spill-over of the off-specular scattering intensity into the measured specular reflectivity using convergent beam geometry with a large slit width. Off-specular intensities can reach a magnitude comparable to the specular component in the high Qz regions in samples with significant lateral structures such as the 3D nanostructures discussed herein.

The patents from the NOVA and KLA also discuss the art of reflective X-ray scattering. The one published in 2018 by NOVA (U.S. patent Ser. No. 10/119,925 B2) is using the conical light source, and its scattering angle is 20 to 40 degrees. It is different from the light source used in present application. The method developed by NOVA can only obtain a scatter pattern on the entire 2D detector screen. A lot of off-specular information will overlap on the screen and it will be very difficult to analyze and distinguish. One solution of NOVA try to propose is using different azimuthal angles to separate the chaotic multi-angle scatter pattern. But there is still lack of results and practical method to obtain the light intensity information in each xyz direction which makes it impossible to analyze the complex 3D structure.

The patent published by KLA in 2019 (US patent 2019/0017946 A1) proposes that different focusing optical elements can be used to produce focus beams with different wavelengths, for example, using a multi-layer coating on a focusing optical lens to focus beams of different wavelengths on the sample. However, the focus beam will still encounter multiple scatterings in the xyz directions at the same time, and it will not be able to analyze and calculate. It also does not describe how to accurately strike the light on the sample at different wavelengths in KLA patent. On the contrary, the long-wavelength light source described in previous invention (US patent 2016/0341674 A1) can be effectively focused on a sample through a monochomator and a slit in the z direction.

In addition, The KLA patent mentions that a response function model can be used to calculate and fit a 3D structure. But due to the multi-combined scattering pattern of 3D pattern is extremely complicated, it is difficult to construct 3D model before this.

SUMMARY

According to one embodiment, an X-ray reflectometry apparatus for measuring three dimensional nanostructures on a flat substrate is provided, including an X-ray source, an X-ray reflector, an incident slit, and an X-ray detector. The X-ray detector is preferably a 2 dimensional detector. The X-ray source is for emitting an X-ray with a wavelength larger than 0.154 nanometers (nm). The X-ray reflector is for point focusing a fan-shape X-ray onto a surface of a sample. The incident slit is between the X-ray reflector and the sample, the width of the incident slit is greater than its opening by a factor 10 or above, and the width of the incident slit is aligned perpendicular to the reflection plane of the X-ray. The X-ray detector has a fine pixel resolution for collecting the X-ray reflected by the surface of the sample, wherein the X-ray is point focused by the X-ray reflector onto the surface with an incident angle adjustable over a preset range. The opening angle of the incident X-ray is controlled via the incident slit opening, and the divergence angle of the fan-shape incident X-ray is controlled via the width of the incident slit. At each azimuthal position of the reflected X-ray collected on the X-ray detector, the off-specular contribution is determined and removed from the reflected X-ray intensity.

According to another embodiment, a method for X-ray reflectometry (XRR) to measure three dimensional nanostructures on a flat substrate is provided. The method includes the following steps. A fan-shape X-ray is point focused onto a surface of a sample with an incident angle, wherein the incident angle is adjustable over a preset range of angle and a wavelength of the X-ray is larger than 0.154 nanometers (nm). The opening angle of the incident X-ray is adjusted according to the incident slit opening when the incident angle is changed. The divergence angle of the fan-shape X-ray is adjusted via the width of the incident slit.

The fan-shape reflected X-ray is collected by using an X-ray detector, and at each azimuthal position of the reflected X-ray collected on the X-ray detector the off-specular contribution is determined and removed from the reflected X-ray intensity. The specular component of the remained X-ray intensity at each azimuthal position is integrated to obtain the specular reflection intensity for each incident angle. The ratio between the specular reflection intensity and the integrated incident X-ray intensity is collected over a preset range of incident angle to obtain structure information of the sample.

According to an alternative embodiment, a method for X-ray reflectometry (XRR) to measure three dimensional nanostructures on a flat substrate is provided. The method includes the following steps. The specular reflection and off-specular reflection of a fan-shape X-ray is collected by using an X-ray detector. At each azimuthal position of the reflected X-ray collected on the X-ray detector, the off-specular contribution is determined and removed from the reflected X-ray intensity.

Figure 1:
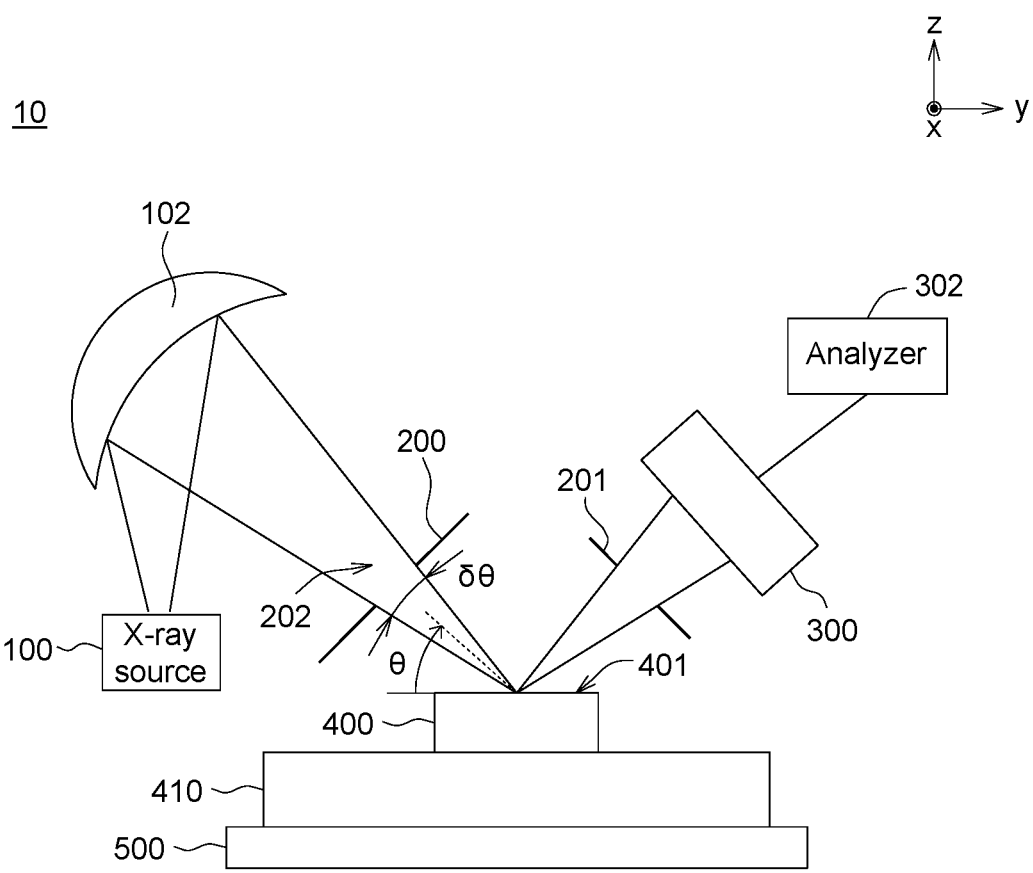
FIG. 1 shows an X-ray reflectometry apparatus according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Details are given in the non-limiting embodiments below. It should be noted that the embodiments are illustrative examples and are not to be construed as limitations to the claimed scope of the present disclosure. The same/similar denotations are used to represent the same/similar components in the description below. Directional terms such as above, below, left, right, front or back are used in the following embodiments to indicate the directions of the accompanying drawings, not for limiting the present invention.

The present disclosure relates generally to the measurement of characterization of three dimensional (3D) nanostructures on a flat substrate. More particularly, the present disclosure relates to an X-ray reflectometry applicable to samples with intricate 3D structures and a limited thickness or height, in the order of nanometers and concurrently with a limited sample area. In a previous invention (US patent 2016/0341674 A1) the challenge related to this minuscule sample volume, a product of thickness and area, has been addressed with a convergent XRR apparatus and method to enhance the incident beam flux, and hence improve the reflection signal strength. At the same time it maintains a desirable resolution in terms of the scattering vector $Q_z$ which is defined in its usual way as $(4\pi/\lambda) \sin\theta$; $\lambda$ stands for the wavelength of the X-ray and $\theta$ is the grazing incident angle between the sample surface and the incident X-ray. The angle $\theta$ is also the detection angle with respect to the sample surface since this previous invention is concerned only with the specular reflection. In this previous invention, convergent long wavelength X-ray is focused on the target area with a tightly controlled opening angle $\delta\theta$ while keeping the opening angle along the azimuthal direction widely open to allow sufficient incident X-ray flux for conducting XRR with a miniscule sampling volume. The purpose of the present disclosure is to extend the abovementioned XRR to measure 3D nanostructures supported on a flat substrate.

The essence of the present disclosure is to use a 2D detector to collect the specularly reflected and the off-specular or scattered X-ray during the reflectivity run and the off-specular contributions resulted from finite coherence length and finite lateral $Q_x$ and $Q_y$ will be determined and removed to obtain the specular reflection intensity.

In applying XRR for nanostructured surface analysis, it is noteworthy that all the information available are along the thickness direction (z-axis given in the drawing); at a given depth the structural result deduced from XRR represents that from the lateral average over the coherence length. To obtain 3D information of the nanostructure from XRR additional input on a characteristic lateral length is needed. Such a length scale can be obtained from a single transmission small angle X-ray scattering (tSAXS) measurement at normal incidence. It is therefore advisable to have tSAXS data taken at normal incidence available together with the XRR data from the sample of interest.

For 3D array of nanostructures the azimuthal placement of the samples can no longer takes advantage of the large projected coherence length along the y axis. In addition, in the convergent beam of XRR scheme depicted in this disclosure, the scattering magnitude of $Q_x$ and $Q_y$ from the angular width of the incident slit and the detector slit projected on the sample surface or the x-y surface. For simplicity, the openings for both incident and the scattering slits are chosen to be identical and denoted as $\phi$ as shown in FIG. 2B. From a straightforward geometrical consideration we have the ranges of $Q_x$ and $Q_y$ situated between $\pm 2\phi(\pi/\lambda) \cos\theta$ and $\pm \phi^2(\pi/\lambda) \cos\theta$ respectively.

Noting that $\phi$ is given in rad and is typically less than unity, e.g. with $\phi=0.26$ or $15°$, $Q_x$ has a range of $\pm 0.52 \, (\pi\lambda)$ $\cos\theta$ while $Q_y$ has a range of $\pm 0.068 \, (\phi/\lambda/A) \cos\theta$. In most convergent beam XRR set-up the angular slit opening in dictated by the focus optics, $15°$ to $20°$ is a typical upper range available. This leads to the condition that $Q_x > Q_y$ in most convergent XRR measurements. For thin film samples, there is no lateral structural variation, the existence of finite $Q_x$, $Q_y$ and lateral coherence length imposes no restriction in the application of convergent XRR. For line grating sample, it is desirable to align the line with the x-axis to mitigate the impact of large $Q_x$ invoked in the XRR measurements. This alignment is also desirable from the lateral coherence length consideration since the coherence length is rather small along the x-axis. For the consequence of misaligning the line gratings, it is also visible from conventional XRR measurements using a highly collimated ribbon incident beam.

Even it is not the convergent incident beam discussed herein, all the discussions regarding coherence length and Ox, Qy are still valid since the only difference is the value of $\phi$ is 15° to 25° in the current case and the value of $\phi$ is about 1° or less for the case of the ribbon beam used in carrying out the work.

Figure 2A:
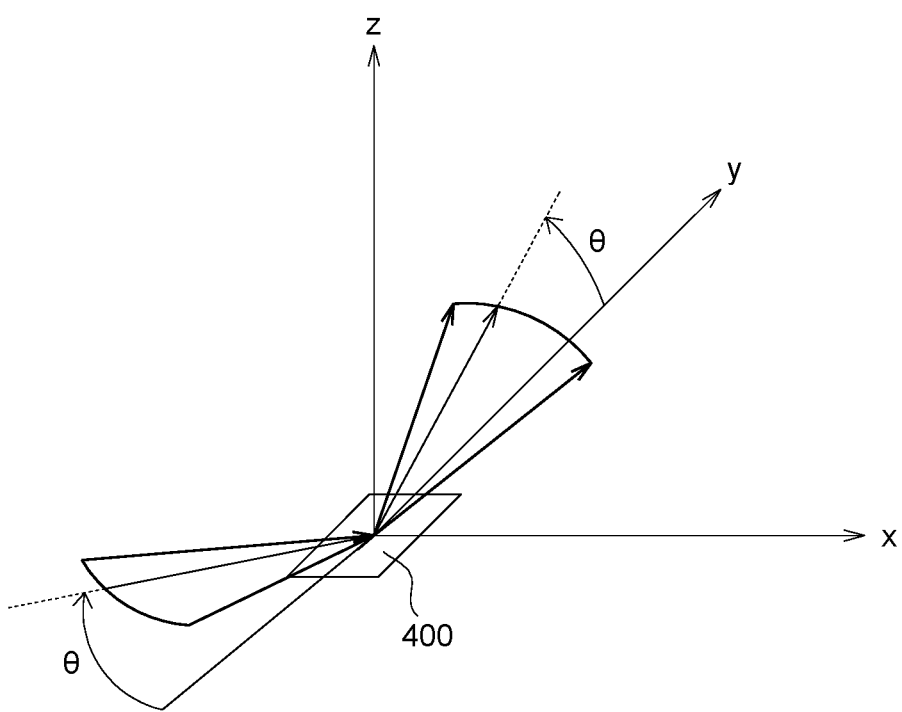
FIG. 2A shows a fan-shaped incident X-ray reflected on the sample.
Figure 2B:
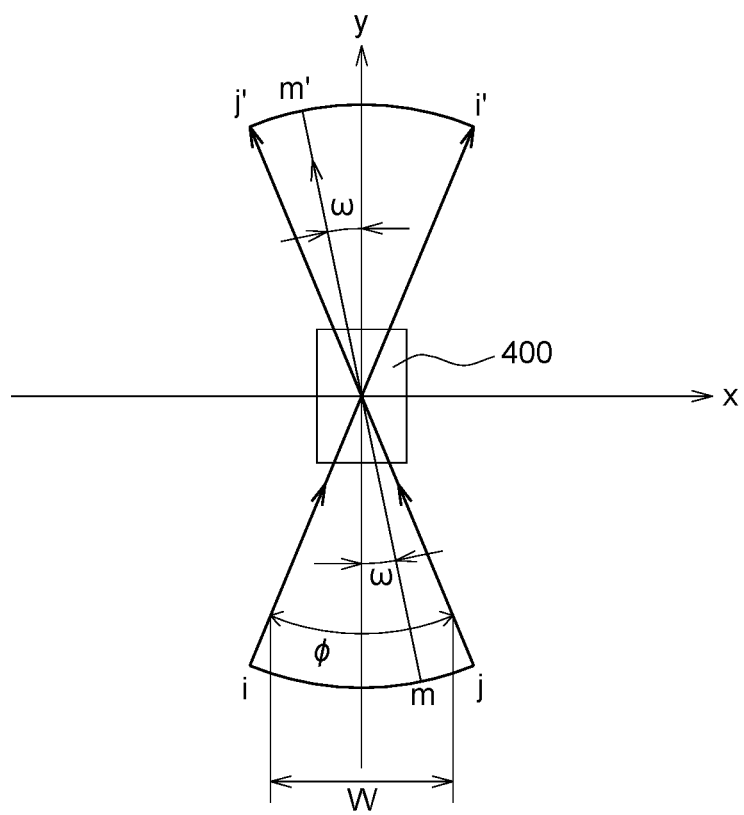
FIG. 2B shows a top-down view of FIG. 2A.
Figure 3:
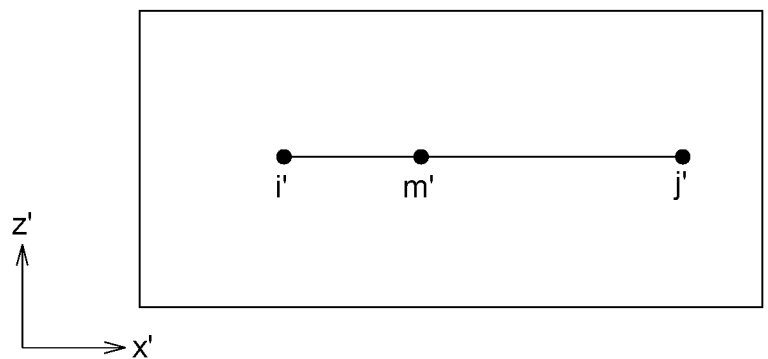
FIG. 3 illustrates the incident wavefront ij is specularly reflected on sample surface and the reflected wavefront recorded on a 2D detector as a line i'j'.

For 3D nanostructures samples often there is no obvious lateral orientation to align with respect to the convergent XRR axes such as x-axis or y-axis shown in FIG. 2A to mitigate the side effects due to finite coherence length and lateral scattering vectors Qx and Qy. The objective of the present disclosure is to mitigate the shortcomings in using convergent XRR method to measure 3D nanostructures on a flat substrate.

The present disclosure can solve this kind of problem on convergent XRR. Firstly, the method herein employs different incident angles $\theta$ which can analyze the depth information in the z direction of the sample. The focused light has integrated the xy information of the 3D sample with the reflectivity value. By analyzing the electron density along z direction correspond to the structural composition at different depths. Combining with known line widths or line space information, the 3D material composition and size can be resolved.

The problem to be solved is that the conventional methods for detecting critical dimensions in the art include atomic force microscope (AFM) and scanning electron microscope (SEM), but they encounter the problem in measuring critical dimensions. The present disclosure provides a method for detecting the critical dimensions of 3D nanostructures on a flat substrate by using convergent long-wavelength X-ray reflectometry. By fan-shaped focusing, the light intensity can be effectively increased, the detection area can be reduced, and the signals along different azimuthal directions can be received at the same time. The integrated incident X-ray intensity is collected at each azimuthal angle to obtain the thickness and density information of the sample through EMA approximation. The depth map is analyzed with the electron density along z direction to detect the pattern thickness, the line width, the line spacing changes in high precision level and has high resolution (less than 0.1 nm).

Referring to FIG. 1, an X-ray reflectometry apparatus 10 for measuring three dimensional nanostructures on a flat substrate according to an embodiment of the disclosure is provided, including an X-ray source 100, an X-ray reflector 102, an incident slit 200, a detector slit 201, an X-ray detector 300 and at least one analyzer 302. The X-ray source 100 is for emitting an X-ray with a wavelength larger than 0.154 nanometers (nm). The X-ray reflector 102 is for point focusing a fan-shape X-ray onto a surface 401 of a sample 400. The X-ray is point focused by the X-ray reflector 201 onto the surface 401 with an incident angle $\theta$ adjustable over a preset range. In an embodiment, the sample 400 is located on a flat substrate 410 and can be rotated 360 degrees by the sample stage 500. The flat substrate 410 is, for example, a semiconductor substrate.

The incident slit 200 is disposed between the X-ray reflector 102 and the sample 400, the width of the incident slit 200 is aligned perpendicular to the reflection plane of the X-ray, and the width of the incident slit 200 is greater than its opening 202 by a factor 10 or above, but the disclosure is not limited thereto. In an embodiment, the opening angle $\delta\theta$ of the incident X-ray is controlled via the incident slit opening 202, and the divergence angle $\phi$ of the fan-shape incident X-ray is controlled via the width W of the incident slit 200. In addition, the detector slit 201 is disposed between the X-ray detector 300 and the sample 400 for controlling the opening angle of the reflected X-ray.

In addition, the X-ray detector 300 has a fine pixel resolution for collecting the X-ray reflected by the surface 401 of the sample 400, and the X-ray detector is preferably a 2 dimensional detector. In an embodiment, at each azimuthal position $\omega$ of the reflected X-ray collected on the X-ray detector 300, the off-specular contribution is determined and removed from the reflected X-ray intensity. The light beam reflected from the surface 401 of the sample 400 can be regarded as a divergent light beam emitted by a new point light source. Therefore, the size of the light spot received by the X-ray detector 300 is related to the distance of the reflected light beam to the X-ray detector. The longer the distance the reflected beam travels, the larger the spot size received by the X-ray detector; conversely, the smaller the spot size received by the X-ray detector. The X-ray detector with fine resolution referred to in the invention means a detector with sufficient resolution capability for distinguishing one reflected light spot from another in a pixel; that is, as long as the size of the light spot falls within a pixel of the X-ray detector, and do not cross to the neighboring pixels of the pixel. Those with ordinary skill in the art should know that a detector with an appropriate resolution can be selected according to the distance of the reflected beam to the X-ray detector.

Referring to FIG. 2A, which shows a fan-shape incident X-ray reflected on the sample 400. The angle $\theta$ between the incident light and the xy plane is the same as the angle $\theta$ between the reflected light and the xy plane.

Referring to FIG. 2B, which shows a top-down view of FIG. 2A. The angle $\phi$ is a divergence angle of the incident light and the reflected light. The term i represents a beam specularly reflected by the sample to i'. Similarly, the term j represents a beam specularly reflected by the sample to j'. Another example in the figure is m-beam which has an angle ca relative to y-axis reflected by the sample to m', ij line and i'j' line can represent the incident light wavefront and the reflected light wavefront, respectively.

Referring to FIG, 3, which illustrates the incident wavefront ij is specularly reflected on sample surface and the reflected wavefront recorded on the 2D X-ray detector as a line i'j'. Each point m' on line i'j' represents a specularly reflection from point m on the incident wavefront at an azimuthal angle $\omega$ shown in FIG. 2B. The specular reflection line can be interpreted as aggregate of numerous specular reflection spots m'.

Figure 4A:
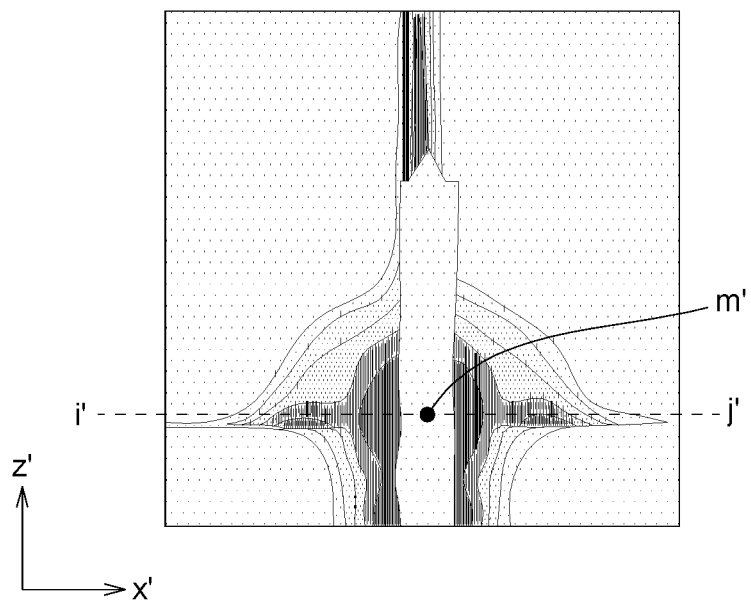
FIG. 4A illustrates a schematic diagram of 2D detector image from a 3D nanoporous thin film on a silicon substrate from a well collimated pencil incident beam.
Figure 4B:
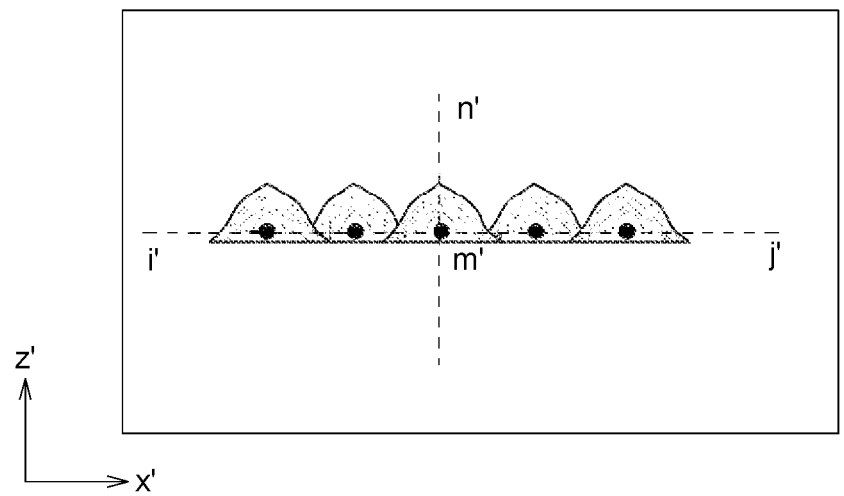
FIG. 4B shows a schematic diagram of 2D detector image from a 3D nanoporous thin film in FIG. 4A from a fan-shape incident X-ray shown in FIG. 2A.

FIG. 4A shows a representative 2D detector image from a 3D nanoporous thin film on a silicon substrate from a well collimated pencil incident beam. FIG. 4B shows a schematic view of 2D detector image from a 3D nanoporous thin film mentioned in FIG. 4A from a fan-shape incident beam shown in FIG. 2A.

Figure 4C:
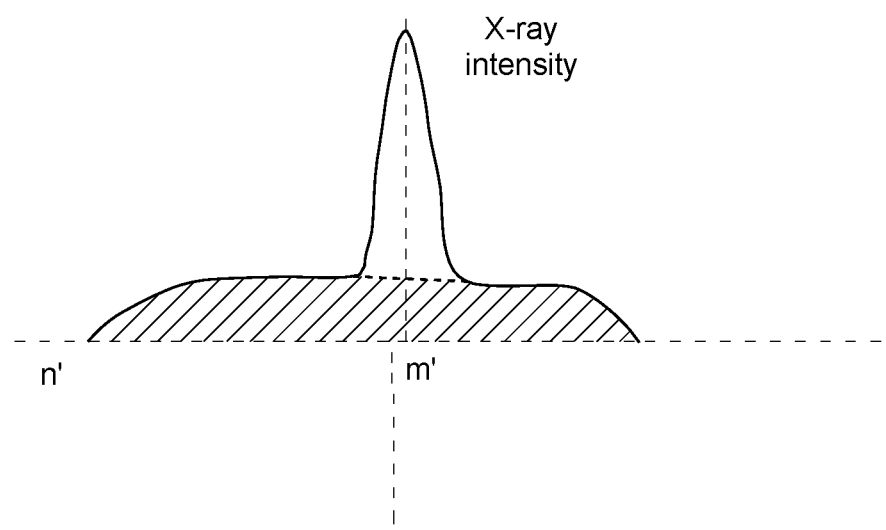
FIG. 4C shows a scattering intensity profile along line m'n' shown in FIG. 4B.

FIG. 4C shows a scattering intensity profile along line m'n' shown in FIG. 4B. The shade part represents the off-specular contribution and shall be removed from the intensity profile to obtain the specular part measure at an incident angle $\theta$ shown in FIG. 2A. Measuring the specular reflection intensities over a preset range of $\theta$ provides the reflectivity result.

Figure 5:
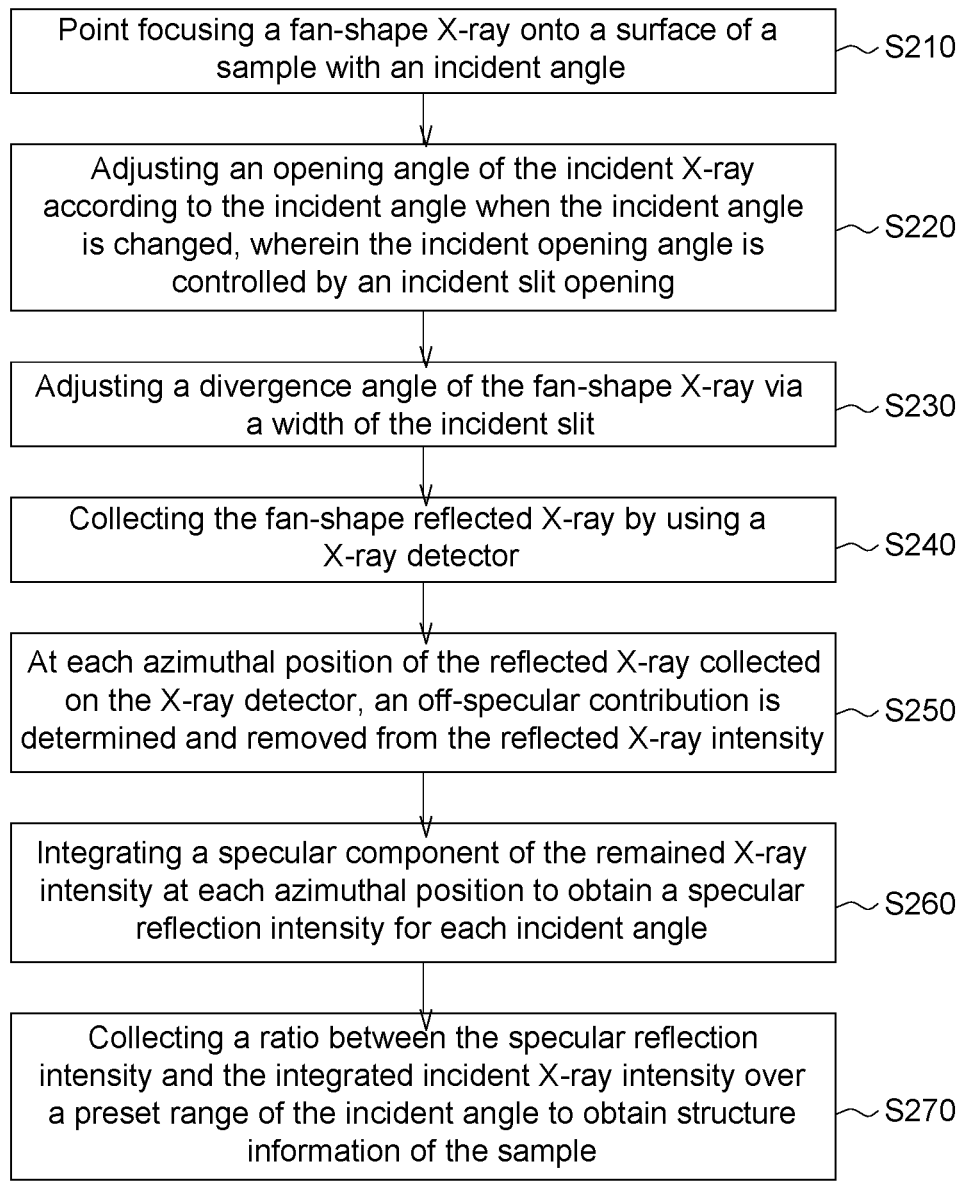
FIG. 5 shows a method for X-ray reflectometry according to an embodiment of the disclosure.

Referring to FIGS. 1 and 5, a method for X-ray reflectometry (XRR) apparatus 10 to measure three dimensional nanostructures on a flat substrate according to an embodiment of the disclosure is provided in FIG. 5. The method includes the following steps. In step S210, a fan-shape X-ray is point focused onto a surface 401 of a sample 400 with an incident angle θ, wherein the incident angle θ is adjustable over a preset range of angle and a wavelength of the X-ray is larger than 0.154 nanometers (nm). In step S220, the opening angle δθ of the incident X-ray is adjusted according to the incident slit opening 202 when the incident angle θ is changed. The incident opening angle δθ is, for example, a function of a tangent of the incident angle θ. In step S230, the divergence angle φ of the fan-shape X-ray is adjusted via the width W of the incident slit 200. In step S240, the fan-shape reflected X-ray is collected by using an X-ray detector 300 and in step S250, at each azimuthal position ω of the reflected X-ray collected on the X-ray detector 300, the off-specular contribution is determined and removed from the reflected X-ray intensity, as shown in FIG. 4D. In step S260, the specular component of the remained X-ray intensity at each azimuthal position ω is integrated to obtain the specular reflection intensity for each incident angle θ. In step S270, the ratio between the specular reflection intensity and the integrated incident X-ray intensity is collected over a preset range of incident angle θ to obtain structure information of the sample 400.

In an embodiment, the wavelength of the X-ray is no more than twice of a characteristic length along the surface normal of a structure of the sample 400.

In an embodiment, the characteristic length is selected from the group consisting of film thicknesses of the surface and heights of a nanostructure of the surface of the sample 400.

In an embodiment, the X-ray reflector 102 is selected from a group consisting of single crystal monochromators and multilayer mirrors. For a multilayer mirror type, the wavelength dispersion of the X-ray reflector 102 is less than 0.01.

In an embodiment, the incident opening angle δθ is a function of the incident angle θ. That is, the incident opening angle δθ can be changed with different incident angles θ.

In an embodiment, the incident opening angle δθ is a function of a tangent of the incident angle θ multiplied by a constant K. (i.e., δθ=K*tanθ).

In an embodiment, the X-ray source includes a fine focused aluminum anode.

In an embodiment, the at least one analyzer 302 is for collecting an X-ray photoelectron spectrum (XPS) and/or an X-ray fluorescence (XRF) signals from the sample during the reflected X-ray is collected by the X-ray detector 300.

In the step S230, the sample stage 500 can be rotated over 360° around the surface normal of the sample 400 such that the XRR measurements can be conducted at different azimuthal angles ω between a given axial line (such as y-axis) assigned on the 3D nanostructures of the sample 400 and the reflection plane of the X-ray.

In the step S240, X-ray photoelectron spectrum (XPS) and X-ray fluorescence (XRF) signals can be collected concurrently during the XRR measurement, the combined XPS, XRF and XRR results will complement each other to enhance the accuracy in the analysis of surface structure information of the sample 400.

The focus beam in this disclosure is confined by a slit in the z direction which makes the divergence angle very small and less than or equal to 1 degree. In the x direction, there is a divergence angle of 15 to 25 degrees which create a multiple-angle scattering diagram in this direction. A line cut can be performed at each angle on the scattering diagram to obtain the intensity value of the specular point. Then the intensities of the angle range are all integrated to obtain the reflectivity of the incident angle. Further, in the present application, the focus beam is chopped in the z direction; the information of the depth in the z direction of the sample can be analyzed according to different incident angles.

According to the mentioned embodiments, an X-ray reflectometry apparatus and a method thereof for measuring three dimensional nanostructures on a flat substrate are provided by adjusting different incident angles θ, such that the critical dimensions of the sample in the z direction can be analyzed. Since the Qx and Qy signals integrates with the reflection signal Qz onto a surface of a sample, and only the light intensity in the Qz direction is taken, the analysis of critical dimensions in different depths can be successful by analyzing the electron density along the z direction vs. the depth map and combining with known line widths or line space information. In addition, the X-ray reflectometry apparatus of the present disclosure uses convergent long-wavelength X-rays, the wavelength of which is greater than a general commercial copper anode of 0.154 nm and less than twice of characteristic dimensions along the film thickness direction, and appropriate collimations on both incident and detection arms are provided to enable the XRR for measurements of samples with limited sample area and scattering volumes, such as a three-dimensional nanostructure sample on a flat substrate (i.e., a semiconductor substrate), to solve the problem of complex nanostructures along three coordinate directions being difficulty to measure by an X-ray reflectometry apparatus, and the complex nanostructures are such as rods or axis arrays with nanometer size.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An X-ray reflectometry apparatus for measuring three dimensional nanostructures on a flat substrate, comprising:
   an X-ray source for emitting an X-ray with a wavelength larger than 0.154 nanometers (nm);
   an X-ray reflector for point focusing the X-ray with fan-shape onto a surface of a sample;
   an incident slit between the X-ray reflector and the sample, a width of the incident slit being greater than an incident slit opening by a factor 10 or above, and the width of the incident slit being aligned perpendicular to a reflection plane of the X-ray; and
   an X-ray detector has a fine pixel resolution for collecting the X-ray reflected by the surface of the sample, wherein the X-ray is point focused by the X-ray reflector onto the surface with an incident angle adjustable over a preset range,
   an opening angle of the incident X-ray is controlled via the incident slit opening, and a divergence angle of the fan-shape incident X-ray is controlled via the width of the incident slit,
   at each azimuthal position of the reflected X-ray collected on the X-ray detector, an off-specular contribution is determined and removed from the reflected X-ray intensity.

2. The X-ray reflectometry apparatus according to claim 1, wherein the X-ray detector is a 2 dimensional detector.

3. The X-ray reflectometry apparatus according to claim 1, wherein the wavelength of the X-ray is no more than twice of a characteristic length along a surface normal of a structure of the sample.

4. The X-ray reflectometry apparatus according to claim 3, wherein the characteristic length is selected from a group consisting of film thicknesses of the surface and heights of a nanostructure of the surface of the sample.

5. The X-ray reflectometry apparatus according to claim 1, wherein the X-ray reflector is selected from a group consisting of single crystal monochromators and multilayer mirrors, and a wavelength dispersion of multilayer mirrors of the X-ray reflector is less than 0.01.

6. The X-ray reflectometry apparatus according to claim 1, wherein the incident opening angle is a function of the incident angle.

7. The X-ray reflectometry apparatus according to claim 6, wherein the incident opening angle is a function of a tangent of the incident angle multiplied by a constant.

8. The X-ray reflectometry apparatus according to claim 1, wherein the X-ray source comprises a fine focused aluminum anode.

9. The X-ray reflectometry apparatus according to claim 1, further comprising at least one analyzer for collecting an X-ray photoelectron spectrum (XPS) and/or an X-ray fluorescence (XRF) signals from the sample during the reflected X-ray is collected by the X-ray detector.

10. A method for X-ray reflectometry (XRR) to measure three dimensional nanostructures on a flat substrate, comprising:
    point focusing a fan-shape X-ray onto a surface of a sample with an incident angle, wherein the incident angle is adjustable over a preset range of angle and a wavelength of the X-ray is larger than 0.154 nanometers (nm);
    adjusting an opening angle of the incident X-ray according to an incident slit opening when the incident angle is changed;
    adjusting a divergence angle of the fan-shape X-ray via a width of the incident slit;
    collecting the fan-shape reflected X-ray by using a X-ray detector, and at each azimuthal position of the reflected X-ray collected on the X-ray detector an off-specular contribution is determined and removed from the reflected X-ray intensity,
    wherein a specular component of the remained X-ray intensity at each azimuthal position is integrated to obtain a specular reflection intensity for each incident angle; and
    a ratio between the specular reflection intensity and the integrated incident X-ray intensity is collected over the preset range of the incident angle to obtain structure information of the sample.

11. The method according to claim 10, wherein the X-ray detector is a 2 dimensional detector.

12. The method according to claim 10, comprising rotating around a surface normal of the sample such that the XRR measurements are conducted at different azimuthal angles between a given axial line assigned on the sample and a reflection plane of the X-ray.

13. The method according to claim 10, wherein the wavelength of the X-ray is no more than twice of a characteristic length along a surface normal of a structure of the sample.

14. The method according to claim 13, wherein the characteristic length is selected from a group consisting of film thicknesses of the surface and heights of a nanostructure of the surface of the sample.

15. The method according to claim 10, wherein the incident opening angle is a function of the incident angle.

16. The method according to claim 15, wherein the incident opening angle is a function of a tangent of the incident angle multiplied by a constant.

17. The method according to claim 10, wherein collecting an X-ray photoelectron spectrum (XPS) and an X-ray fluorescence (XRF) signals from the sample during the reflected X-ray is collected by the X-ray detector, and the XPS, XRF signals and XRR results are for analysis of surface structure information of the sample.

* * * * *